Dec. 20, 1955  R. J. SCHAEFER ET AL  2,727,791
HOPPER FEED
Filed July 2, 1952  3 Sheets-Sheet 1
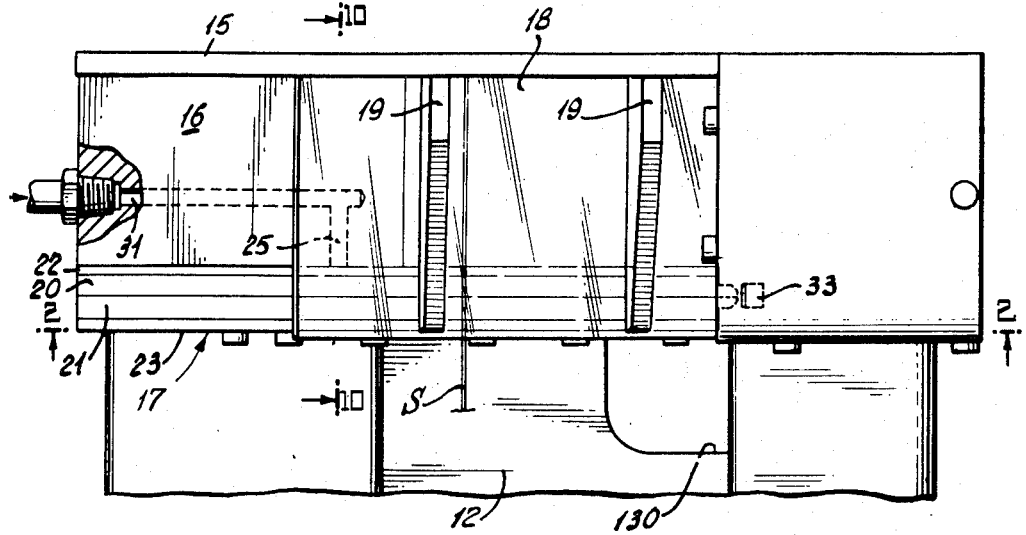
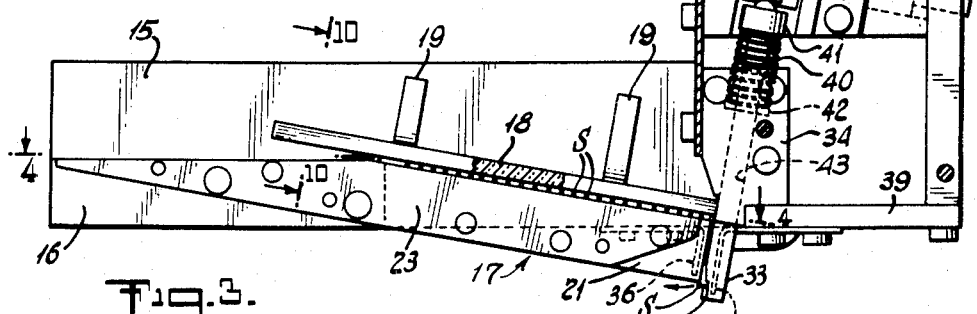
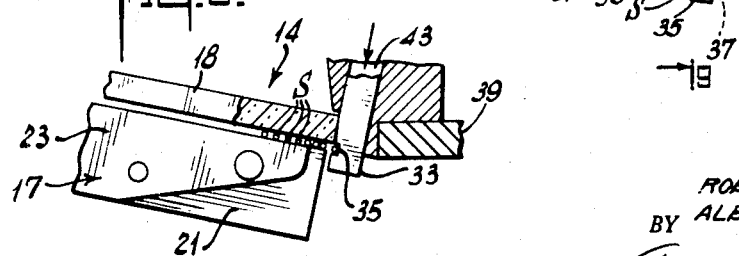
INVENTORS:
ROBERT J. SCHAEFER
BY ALBERT P.F. DOMPKE
Arnold S. Norfolk
ATTORNEY.

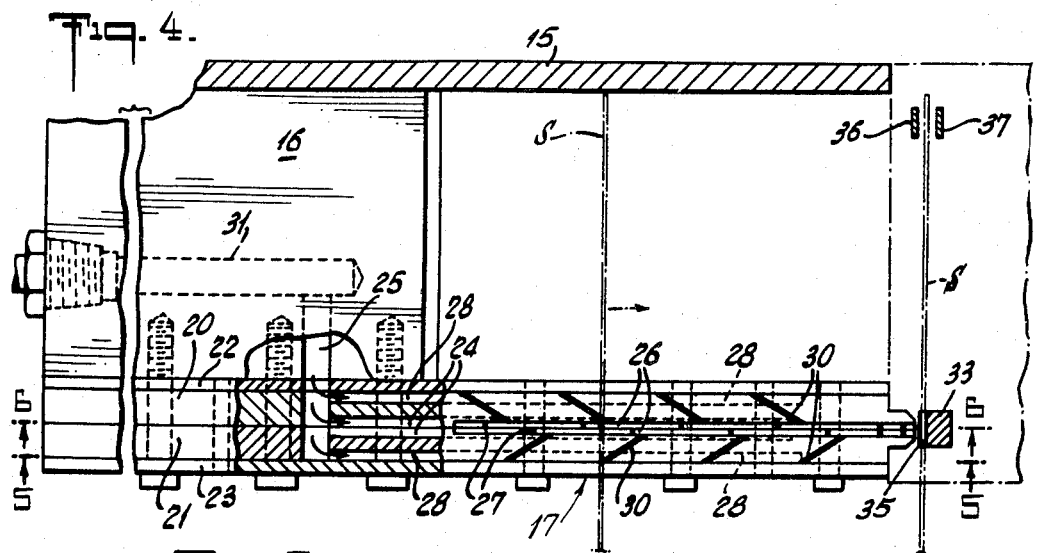
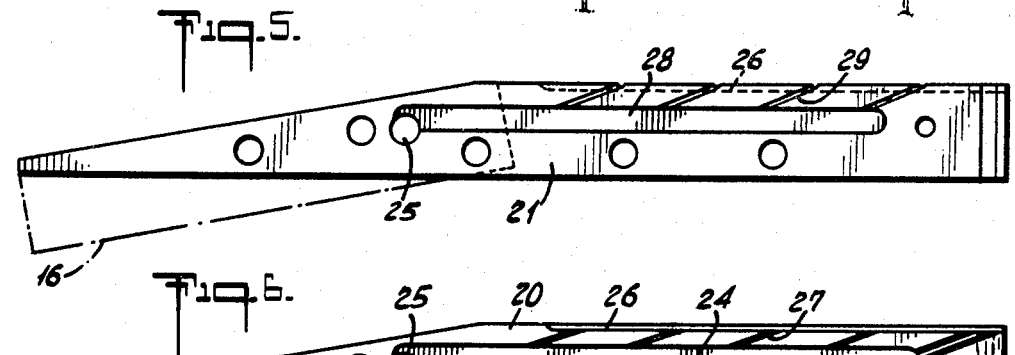
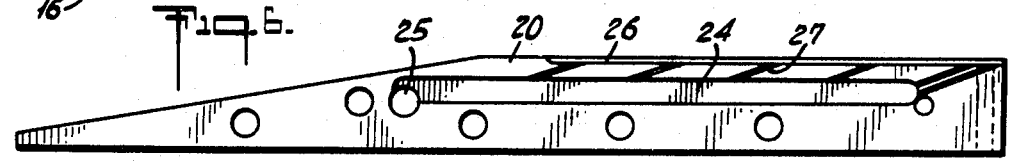
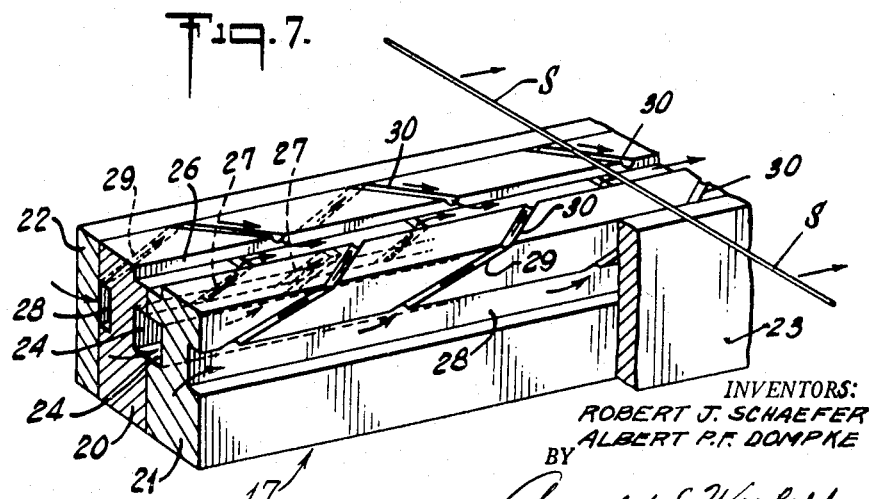

Dec. 20, 1955  R. J. SCHAEFER ET AL  2,727,791
HOPPER FEED
Filed July 2, 1952  3 Sheets-Sheet 3
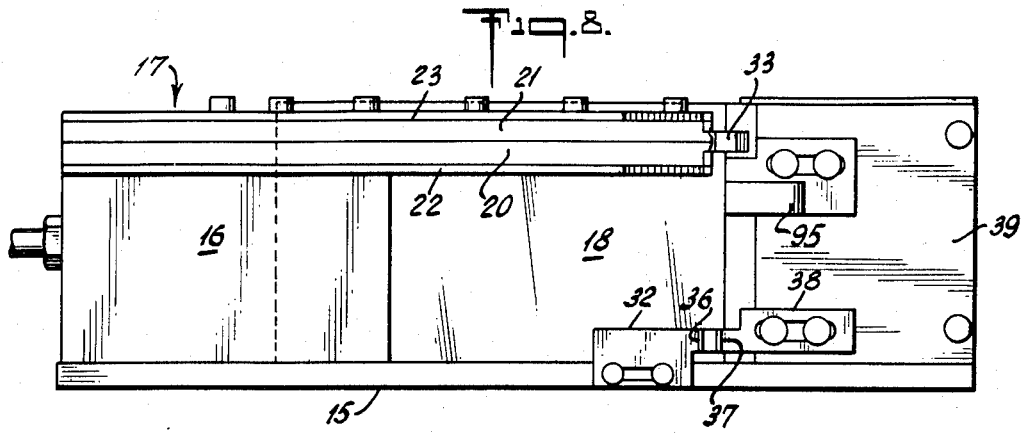
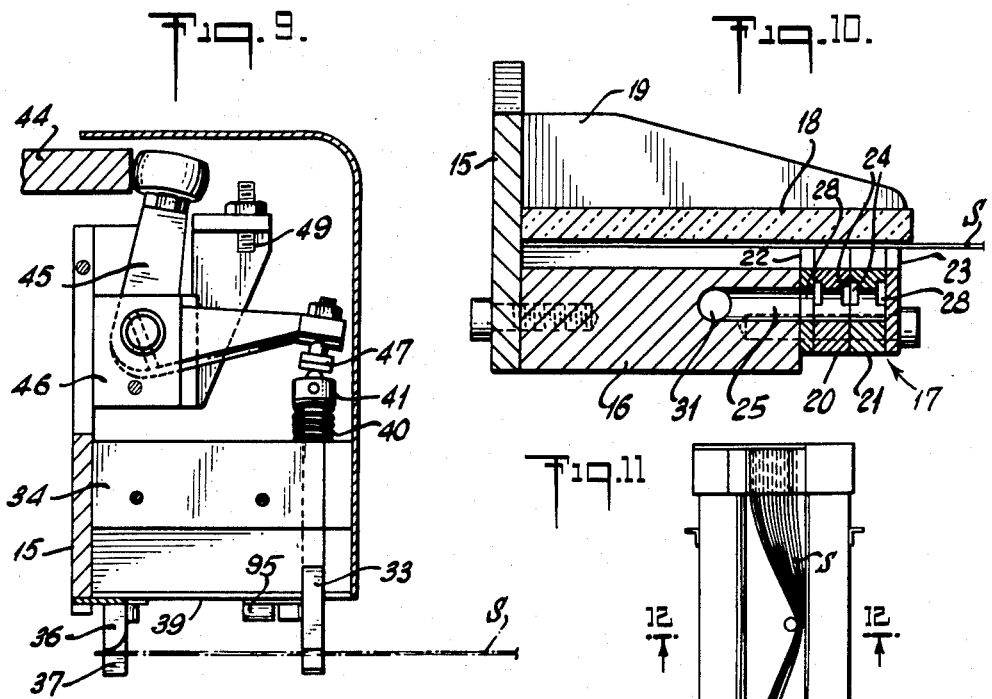
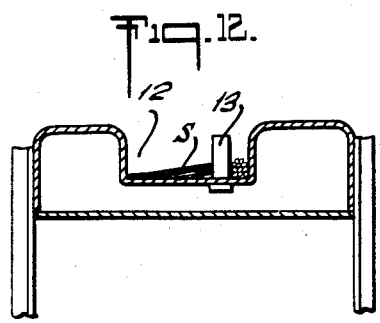
INVENTORS:
ROBERT J. SCHAEFER
ALBERT P. F. DOMPKE
BY
Arnold S. Worfolk
ATTORNEY

United States Patent Office 2,727,791
Patented Dec. 20, 1955

2,727,791
HOPPER FEED

Robert J. Schaefer, Chatham, and Albert P. F. Dompke, Somerville, N. J., assignors to Ethicon, Inc., a corporation of New Jersey Application July 2, 1952, Serial No. 296,846

8 Claims. (Cl. 302—2)

This invention relates to hopper mechanism for feeding slender articles of various kinds and including flexible strands, for transfer one at a time from the outlet end of the hopper to other devices for further processing or other disposition. It has particular application in the handling of surgical sutures which usually are round and flexible and accordingly it has been described in connection with mechanism particularly suited for that purpose although obvious modification will adapt the mechanism for other purposes as well.

According to the modification selected as illustrative, a bundle of sutures are arranged in a trough which terminates in a hopper adapted to receive the leading end portions of the sutures. The hopper has a suture supporting member and an overlying cover plate spaced apart to define a channel sufficient to accommodate one course only of the sutures. A back plate serves as an abutment to locate corresponding ends of the sutures all in alignment. Means are provided, in association with the channel to cause a fluid stream, such as air, to impinge upon the sutures in a manner to cause them to move sideways in the hopper from the inlet end to the outlet end thereof where mechanism is disposed for transferring them one at a time from the hopper for further disposition.

A better understanding of the invention may be had by referring to the accompanying drawings wherein:

Fig. 1 is a top plan view of a suture feeding hopper equipped with the present improvements;

Fig. 2 is a front elevation of the suture feeding hopper looking in the direction of line 2—2 in Fig. 1;

Fig. 3 is an enlarged fragmental elevation of part of the mechanism shown in Fig. 2, partially broken away to show detail;

Fig. 4 is a horizontal section of line 4—4 of Fig. 2, some parts being broken away to show detail;

Fig. 5 is a vertical section on line 5—5 of Fig. 4;

Fig. 6 is a vertical section on line 6—6 of Fig. 4;

Fig. 7 is a fragmental perspective view of a portion of the suture supporting rail and showing detail of the air passageways;

Fig. 8 is an inverted plan of the suture feeding hopper shown in Fig. 1;

Fig. 9 is a vertical section on line 9—9 of Fig. 2;

Fig. 10 is a vertical section on lines 10—10 of Figs. 1 and 2;

Fig. 11 is a top plan view showing the suture feeding hopper with its associated suture supporting trough; and Fig. 12 is a section on line 12—12 of Fig. 11.

The objects to be handled by the hopper, in this instance a bundle of flexible sutures S, are arranged in a trough 12 preferably made of sheet metal bent to shape and provided at spaced intervals along its length with a series of vertical pegs 13 alternately staggered about the longitudinal center line of the trough (Figs. 11 and 12). The bundle of sutures is disposed sinuously in the trough by winding it around each of such pegs between them and the nearer adjacent side of the trough, the arrangement being such that as the strands are pulled endwise out of the trough one at a time, sufficient friction is exerted on the remainder of the strands in the bunch so that tangling thereof is avoided.

The trough 12 terminates in a hopper 14 (Figs. 1, 2 and 11) comprising in part, a vertical back plate 15, a horizontal base plate 16 extending from the left end to substantially the center of the back plate, a supporting rail 17 mounted at the front end of the base plate and which extends beyond it toward the right downwardly to the outlet end of the hopper, and a cover plate 18 (preferably transparent) overlying the supporting rail and which is spaced apart therefrom a distance slightly greater than the diameter of the sutures being handled so as to permit only a single course of the sutures to be accommodated between the rail and the plate. (See also Fig. 3.) The cover plate 18 continues toward the left for a short distance beyond the right edge of the horizontal base plate 16 so that between these two elements at this point, there is a wedged shape opening which facilitates insertion of the flexible strands laterally into the hopper 14. When this is accomplished, care is taken that the leading ends of the sutures engage the back plate 15 so that they will all have the same relative position as they pass through the hopper. The top plate is supported by and is secured to the underside of brackets 19 fixed to and which extend forwardly from the back plate.

The sutures in passing through the hopper, are moved down the inclined supporting rail 17 thereof by an air stream which edges the sutures along (Figs. 4, 5, 6 and 7). For this purpose, the supporting rail 17 is built up of four plates 20, 21, 22, 23 held together facewise, one behind the other, as by screws which pass through them and are threaded into the front face of the base plate 16 (Fig. 4). The two center plates 20, 21 are formed in their adjacent contacting faces each with a longitudinal groove 24 which extends from a horizontal fore and aft passageway 25 drilled through the plates, to a point of termination which is just short of the rightmost ends of the plates. These grooves are in registry and together constitute an air passageway 24. The plates are also provided in their upper adjacent edges with longitudinal recesses which together form a depressed passageway or channel 26 open at the top and which extends from near the inlet end of the hopper to the outlet end thereof. This passageway or channel is connected with the air passageway 24 between the plates by a series of ducts 27 inclined upwardly and toward the outlet end of the hopper and formed by registering grooves likewise cut into the inner adjacent faces of the plates 20, 21.

The two center plates 20, 21 are likewise formed in their opposed outer faces each with a longitudinal groove 28 similar to those in the inner adjacent faces and which extends from the fore and aft passageway 25, to the right but which terminates not quite as far to the right as the passageway 24 between the plates. These grooves 28 are closed by the outer face plates 22 and 23 and constitute passageways which are connected each with the top central channel 26 by a series of ducts 29 cut into the outer opposed faces of the plates 20, 21 and which are inclined upwardly and toward the outlet end of the hopper. These ducts in turn are connected at their upper ends each with a horizontal duct 30 cut into the top edges of the center plates and which angles forwardly in the direction of suture feed and inwardly toward the channel 26. These horizontal ducts 30 in the respective central plates 20, 21 are positioned in staggered relation with respect to each other.

As previously stated the passageways 24, 28 are connected at the inlet end of the hopper with the fore and aft passageway 25 which is drilled through all the plates with the exception of the front outermost plate 23 and also partly through the base plate 16 of the hopper, rearwardly to a point of intersection with another horizontal passageway 31 drilled straight inwardly into the base plate from the left end thereof as shown in Fig. 4. This passageway connects with a source of air pressure not shown.

According to the arrangement just described, air blows in through the passageways 31, 25, 24, 28, and up through the ducts 27, 29, 30, converging in the channel 26 in a way such as to impinge on the sutures and urge them sideways along through the hopper to the outlet end thereof. Except for the support given by the rail 17 (i. e., the plates 20, 21, 22 and 23) the sutures are otherwise unsupported as they move through the hopper from the time they leave the base plate 16 until they near the outlet end of the hopper, where their ends engage the top of a small plate 32 secured to the bottom edge of, and which extends forwardly for a short distance from, the back plate 15 (Fig. 8).

At the outlet end of the hopper 14, in longitudinal registry with the air channel 26, there is a slide 33 arranged for vertical movement in a block 34 fixed to the back plate 15 (Figs. 1, 2, 3, 8 and 9). When the slide is in its topmost or normal position (Fig. 3), a horizontal notch 35 therein of size suitable to receive a single suture is located in position to receive a stuture from the outlet end of the hopper 14. At the apppropriate time the slide 35 moves downwardly to transfer the suture to another mechanism of the machine (not shown). As the suture is moved downwardly by the slide, its leading end is guided between a pair of fingers 36, 37 located substantially in fore and aft alignment with the slide 33. One of the fingers 36 depends from the small plate 32 that supports the end of the suture in the hopper and the other from a somewhat similar plate 38 secured at the underside of a base plate 39 forming part of a small frame supported by the back plate of the hopper.

The slide 33 is biased to its normal raised position by an encircling spring 40 which reacts between a collar 41 pinned to the slide at the top, and the base of a recess 42 constituting an enlargement of a hole 43 which guides the slide in its up and down movement (Figs. 2 and 3). At such time as it is desired to withdraw a suture from the hopper which may be periodically or not as desired, a device represented by an element 44 is caused to engage the top end of an upwardly extending arm of a bell crank lever 45, fulcrumed on a bracket 46 supported by the frame, and rocks the lever in a direction to cause an adjustable banking screw 47 threaded through a forwardly extending arm of the lever to engage the top end of the slide 33 and move it downwardly. This projects the suture carried in the notch 35 of the slide into the path of a suitable mechanism not shown, but which will remove the suture from the notch for such disposition as is desired.

The slide 33, after its notch has been relieved of the suture, returns upwardly to its normal position ready to receive the next suture. This is accomplished by the spring 40 as the element 44 moves to permit restoration of the bell crank lever 45 to its normal position. Incidentally, the bell crank lever has an anti-friction roller at the end of its upwardly extending arm for engagement by the element 44 when the latter say is in the nature of a cam which is caused to rotate past the upper end of the bell crank lever. An adjustable banking screw 49 in the lever supporting bracket 46 overlying the forwardly extending arm of the lever permits the notch in the slide to be properly aligned with the outlet end of the hopper. The banking screw 47 in the forwardly extending arm of the bell crank lever permits adjustment in the lowermost position of the slide.

In view of the description heretofore given, it is believed that the operation of the improved device will be readily apparent to those skilled in the art. It should be understood that the invention has been described in connection with one embodiment only thereof and that many modifications are included within its spirit. The invention therefore is to be limited only by the scope of the appended claims.

What is claimed is:

1. A hopper comprising a plurality of members having opposed faces spaced to define a channel accommodating one course only of articles to be conveyed sidewise from the inlet to the outlet end thereof, a passageway recessed into the face of one of said members and opening into said channel and extending longitudinally from the inlet to the outlet end thereof, and means for directing fluid through said passageway in direction to impinge upon said articles to effect such conveyance.

2. A hopper comprising a plurality of members having opposed faces spaced to define a channel accommodating one course only of articles to be conveyed sidewise from the inlet to the outlet end thereof, a passageway extending longitudinally and depressed into the face of one of the members defining the channel, a plurality of fluid conveying ducts communicating with said passageway at spaced intervals therealong and disposed, planewise, at an angle thereto and inclined with respect to the passageway in direction such that fluid emanating from the ducts flows through the passageway in direction to impinge upon said articles to effect such conveyance, and means for connecting said ducts with a source of fluid under pressure.

3. A hopper comprising a plurality of members having opposed faces spaced to define a channel accommodating one course only of articles to be conveyed sidewise from the inlet to the outlet end thereof, a passageway extending longitudinally and depressed into the face of one of the members defining the channel, a plurality of fluid conveying ducts communicating with said passageway at spaced intervals therealong and disposed in the plane thereof and inclined in the direction of article feed such that fluid emanating from the ducts flows through the passageway in direction to impinge upon said articles to effect such conveyance, and means for connecting said ducts with a source of fluid under pressure.

4. A hopper comprising a plurality of members having opposed faces spaced to define a channel accommodating one course only of articles to be conveyed sidewise from the inlet to the outlet end thereof, a passageway extending longitudinally and depressed into the face of one of said members defining the channel, a plurality of fluid conveying ducts communicating with said passageway at spaced intervals therealong, said ducts being disposed, planewise, some at an angle to the passageway, and others in the plane thereof and all inclined with respect to the passageway in direction such that fluid emanating from the ducts flows through the passageway in direction to impinge upon said articles to effect such conveyance, and means for connecting said ducts with a source of fluid under pressure.

5. A hopper according to claim 4 wherein the ducts entering into and which are located in the same plane as the passageway are inclined some in one direction and others in the opposite direction, the oppositely directed ducts being staggered with respect to each other along the passageway.

6. A hopper according to claim 1 wherein the inlet to the channel is flared to facilitate sidewise insertion of the articles therein.

7. A hopper according to claim 1 wherein there is provided a back plate at right angles to the plane of the channel to serve as an abutment endwise to line up the articles for sidewise movement through the hopper.

8. A hopper according to claim 1 wherein the channel is open along one edge to accommodate sidewise movement of articles whose length cannot be accommodated in the hopper.

References Cited in the file of this patent

UNITED STATES PATENTS

| Number | Name | Date |
|---|---|---|
| 662,574 | McGary | Nov. 27, 1900 |
| 756,600 | Dodge | Apr. 5, 1904 |
| 2,342,680 | Melzer | Feb. 29, 1944 |
| 2,525,765 | Betge | Oct. 17, 1950 |